Feb. 27, 1940. H. SHORE 2,191,867
FACSIMILE RECORDER
Filed Oct. 12, 1937
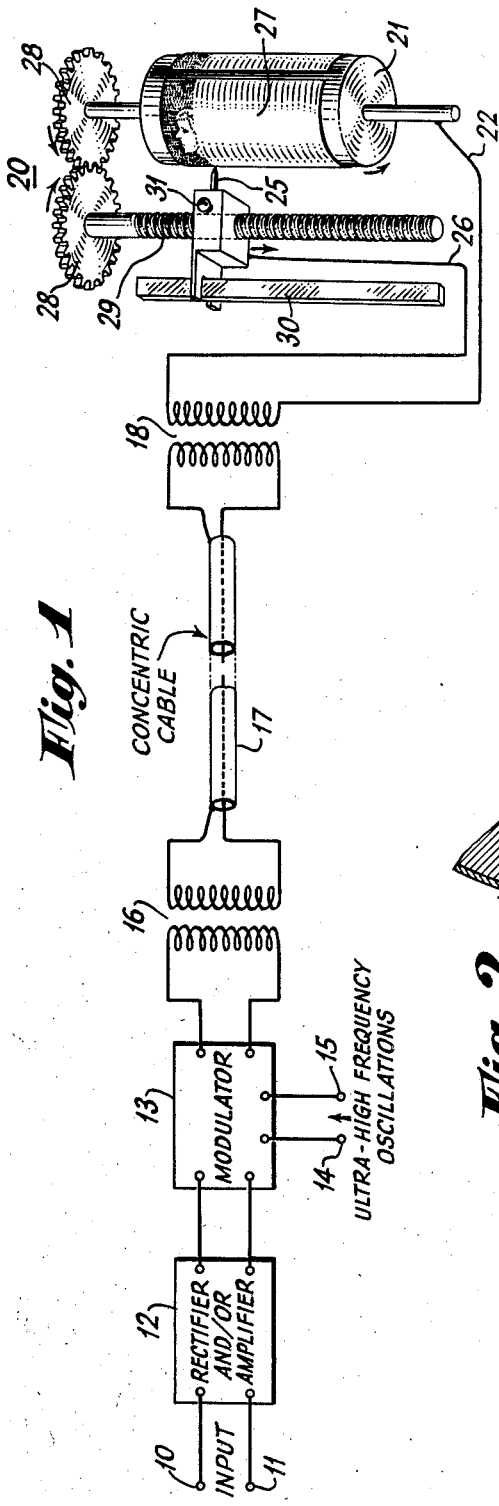
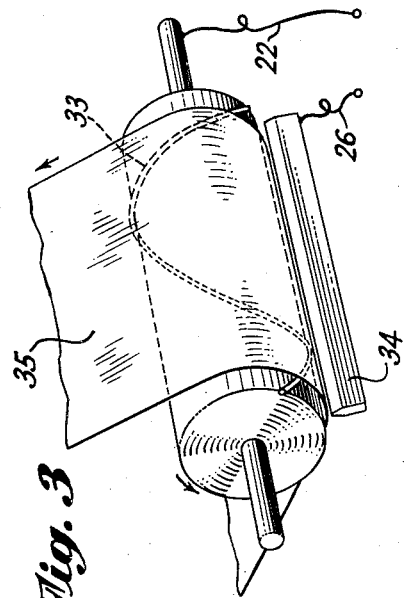
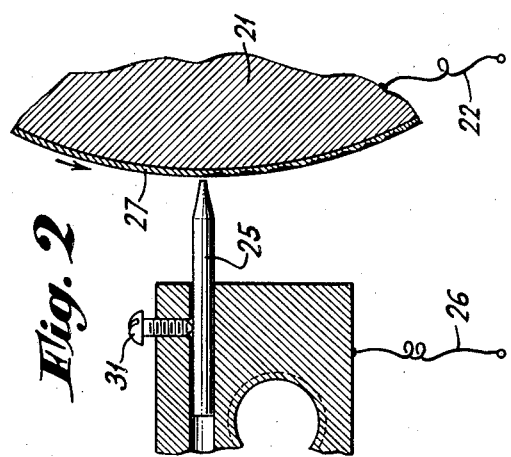
INVENTOR.
HENRY SHORE
ATTORNEY.

Patented Feb. 27, 1940

2,191,867

UNITED STATES PATENT OFFICE 2,191,867

FACSIMILE RECORDER

Henry Shore, Brooklyn, N. Y., assignor to Radio Corporation of America, a corporation of Delaware Application October 12, 1937, Serial No. 168,576

2 Claims. (Cl. 178—13)

This invention relates to a new and improved method of and means for producing recordings in a facsimile receiving apparatus.

More specifically, the present invention relates to an improved manner in which the paper used in the facsimile receiving apparatus is operated upon in order that the image or subject matter being transmitted may be permanently recorded thereon. In the present invention, it is proposed to use a paper which is responsive to the presence of heat such as, for example, a pyro recording paper, and the heat for "triggering" a paper which has been so sensitized is produced by dielectric losses in the paper when the paper is passed between two electrodes which form the plates of a condenser.

In previously used facsimile recording systems various means for producing an image or subject matter upon the recording paper have been used, the most common being the use of carbon paper and an electro-mechanically controlled printer bar which applies varying degrees of pressure to the carbon paper in order to transfer the carbon to the recording paper in accordance with the signals received to reproduce the image being transmitted. An example of such a device is shown in the patent to Charles J. Young, Reissue No. 20,152, October 27, 1936.

Other known methods of recording include the use of a jet of hot air, the direction or intensity of which is controlled by means of the received signal variations. When such a method is used a heat sensitive recording paper is of course employed.

Another method of recording includes the use of a very fine jet of ink or colored fluid which is caused to be deflected by electrostatic and/or electro-magnetic means in order that it may be permitted to impinge upon the recording paper in accordance with signal variations received from the facsimile transmitting device. The patent to Richard H. Ranger, No. 1,770,493, July 15, 1930, shows, for example, devices wherein jets of hot air or ink are used in facsimile recording.

In the present system, as stated above, a pyro sensitive recording paper is used and the heat for causing particular portions of the paper to change in color is produced within the paper as a result of dielectric losses which are induced therein because of the presence of ultra high frequency oscillations being impressed upon what are in effect condenser plates on each side of the recording paper. Such a method is a decided improvement over the well-known manner in which a stream or jet of hot air is used inasmuch as the heat is generated within the paper and as a result much greater detail can be produced. Where a jet of hot air is directed against the paper it is difficult to control the amount and direction of the jet of air and, furthermore, the air necessarily spreads and is deflected when it strikes the pyro recording paper. This spreading or deflection of the jet of hot air may cause a certain degree of fuzziness and a corresponding loss of detail.

A further advantage of the present invention resides in the fact that the invention may be used in connection with any of the well known recording apparatuses such as the type in which a drum carrying the recording paper is rotated as a recording point is moved axially along the surface of the drum, as shown, for instance, in the patent to A. G. Cooley No. 2,052,383, or the device may be used very conveniently in recorders of the helix drum and printer bar type such as, for example, shown in the patent to Charles J. Young, Reissue No. 20,152, mentioned above. The invention may also be conveniently used in recorders of the Alexanderson type wherein continuous recordings may be made. As an example of this type of recording reference is made to the patent to Alexanderson No. 1,792,264, February 10, 1931.

One purpose of the present invention, therefore, resides in the provision of a new and improved method of and means for producing a record on a recording paper in a facsimile receiver.

A further purpose of the present invention resides in the production of images in a facsimile receiver by means of heat, the heat being produced within the recording paper.

A further purpose of the present invention is the provision of means whereby the heat produced as a result of dielectric losses may be used for facsimile recording.

A still further purpose of the present invention is the provision of a new and improved means for applying heat to pyro sensitive papers, the means being readily adaptable to any of the well-known recording apparatuses.

Still further purposes and advantages of the present invention will become apparent to those skilled in the art by reading the following specification and claims, particularly in connection with the drawing, wherein the reference numerals represent like parts and wherein:

Figure 1 shows schematically a facsimile recording system constructed in accordance with the present invention.

Figure 2 shows an enlarged detail view of the recording paper and elements cooperating therewith to produce an activation of the recording paper, and Figure 3 shows a further adaptation of the present invention.

Referring to the drawing, the signals as received at the facsimile recording station are applied to the input terminals 10 and 11. These signals may be in the form of a modulated carrier frequency and may be collected by an aerial or they may be received by means of a direct wire connection to the facsimile transmitting device in which case they may or may not appear as a modulated signal. These signals are applied to a rectifier and/or amplifier 12 in order to increase their intensity and the output of the rectifier and/or amplifier 12 is in the form of voltage variations which correspond to the voltage variations as produced at the facsimile transmitter as a result of the scanning operation. The output of the rectifier and/or amplifier 12 is connected to a modulating device 13 to which device is also connected a source of ultra high frequency oscillations, these oscillations being connected to the terminals 14 and 15 of the modulator. The modulator 13 operates in a manner which is well known in the art and the high frequency oscillations as modulated in accordance with the signal variations appear, therefore, in the output of the modulator and these modulated signals are applied to the primary of the transformer 16. The secondary of the transformer 16 is connected to a transmission line which is preferably in the form of a concentric cable 17, the other end of which is connected to the primary of the transformer 18.

Normally, the distance between the modulator and the facsimile recording apparatus is not great; however, a separation of several feet might necessitate the use of a conductor such as a concentric cable in view of the fact that oscillations of such a high frequency are used and through the use of such a cable attenuation of the modulated high frequencies is prevented. If the modulator and the facsimile receiving apparatus are very closely positioned with respect to each other, then the concentric cable may be dispensed with and the output of the modulator may be applied directly to the recording apparatus.

The secondary of the transformer 18 is connected to the facsimile recorder 20, one terminal of the secondary being connected to the drum 21 by means of conductor 22 and the other terminal of the secondary being connected to the recording point 25 by means of the conductor 26.

The facsimile recording apparatus 20 as shown by Figure 1 is of the type wherein the recording paper 27 is wrapped about a drum which is rotated continuously at a uniform rate of speed and in synchronism with the rotation of a similar drum in the facsimile transmitting apparatus. The recording point 25 is moved along the surface of the drum in a direction parallel to the axis thereof at a slow rate of speed in order that each revolution of the drum will reproduce one scanned line of the transmitted picture or subject matter. The recording point is usually coupled to the rotating drum by some mechanical means such as by the gear wheels 28, and is longitudinally driven by means of a screw thread 29 connected to one of the gear wheels. A stationary bar 30 is generally provided for preventing the recording point from rotating with the screw thread, as shown in the drawing. This type of facsimile recorder is well known in the art and a further explanation of the construction and operation is believed to be unnecessary.

In Figure 2 is shown an enlarged detailed view of the drum 21 and recording point 25 of the recording apparatus 20, only a portion of the complete drum being shown. The recording point 25 is preferably adjustably held in cooperative relationship with respect to the paper by means of a set screw 31 and is spaced from the paper by a very small amount. It may be seen from Figure 2 that the end of the recording point 25 is flat, but if particular refinement is desired it may be curved, the radius of curvature being the distance from the point to the center of the drum. The end of the recording point, together with the surface of the drum 21, forms the plates of a condenser with the recording paper positioned therebetween as a dielectric.

When the modulated ultra high frequency oscillations are applied to the recording point 25 and the drum 21, a dielectric loss is induced in the recording paper 27 since it forms the dielectric of the condenser and it is this dielectric loss which produces sufficient heat within the paper to cause a "triggering" of the pyro responsive paper. Obviously the recording point is made rather small, the area of the flat or curved end portion thereof being elementary. The size of this recording point determines to a certain degree the sharpness of the reproduced image and the number of lines which may be reproduced per linear length of the recording sheet.

To improve the operation of the system, the circuit including the secondary of transformer 18 and the condenser produced by the recording point and the drum, may be tuned to the ultra high frequency oscillations, the parameters of the circuit being chosen to form a series resonant circuit.

Figure 3 shows a portion of a facsimile recorder wherein a drum having a helix 33 is used, the helix cooperating with a printer bar 34. The recording paper 35 is passed between the drum and the printer bar and is advanced at a slow rate of speed as compared to the speed of rotation of the drum. This type of a recording device is well known and is generally used in facsimile receivers wherein the record is reproduced by means of carbon paper.

When the present invention is used with a facsimile recorder such as shown in Figure 3, the printer bar is maintained stationary and very slightly spaced from the recording paper 35, the printer bar corresponding in operation to the recording point 25 in Figure 2. As the drum is rotating the spiral produces a scanning operation and the edge of the helix, together with the face of the bar 34, forms the plates of a condenser between which is positioned the recording paper for producing dielectric losses in the recording paper as a result of the modulated ultra high frequency oscillations being applied to the printer bar or elongated electrode and the helix.

It may therefore be seen from the above that a new and improved method of facsimile recording has been developed wherein great detail in the recorded image may be produced. It may also be seen that the apparatus is simple in nature and is not subject to rapid deterioration or wear since none of the active recording parts come in contact with each other and since in no case is there an electrical current discharge between the recording point and the drum. Furthermore, it is possible, because of the method of operation of the present invention, to use a pyro sensitive paper which is relatively economical to produce or procure and which will reproduce particularly good recordings when used with the present system.

It is to be understood that the present system may be used in connection with any recording paper which will respond to the presence of heat to produce a discoloration within the paper or on the surface thereof in order that recordings may be caused to appear on the paper.

It is further to be understood that the ultra high frequency oscillations may be of any magnitude so long as the rate of oscillation is sufficiently high to produce enough dielectric loss in the recording paper to cause it to respond to the heat produced.

Various modifications or alterations may be made in the present invention without departing from the spirit and scope thereof and it is desired that any and all such modifications be considered within the purview of the present invention.

Having now described my invention, what I desire to secure by Letters Patent is:

1. In a facsimile system wherein is included a conducting record support element having positioned thereon a heat sensitive recording material and wherein a stylus element is positioned substantially adjacent the recording material so that the stylus element and the record support together form a condenser element with the heat sensitive recording material constituting the dielectric element thereof, the method of producing images upon the recording material which comprises the steps of receiving image signal energy, generating electrical oscillations of ultra high frequency and of a voltage insufficient to produce recording electronic discharge between the stylus element and the record support element, modulating the developed ultra high frequency oscillating energy by the received image signal energy, impressing the modulated ultra high frequency energy between the stylus and record support elements to develop in the condenser formed by said elements dielectric heat losses to produce proportional intensity sharply defined marking indicia upon that area of the recording material substantially instantaneously adjacent the stylus, and providing relative movement between the stylus and the recording material to produce, under the control of the heat losses developed, a recorded pattern on the recording material.

2. In a facsimile system wherein is included a conducting record support element having positioned thereon a heat sensitive recording material and wherein a stylus element is positioned substantially adjacent the recording material so that the stylus element and the record support together form a condenser element with the heat sensitive recording material constituting the dielectric element thereof, the method of producing images upon the recording material which comprises the steps of receiving image signal energy, generating electrical oscillations of ultra high frequency and of a voltage insufficient to produce recording electronic discharge between the stylus element and the record support element, modulating the developed ultra high frequency oscillating energy by the received image signal energy, impressing the modulated ultra high frequency energy between the stylus and record support elements to develop in the condenser formed by said elements dielectric heat losses for thermally inducing chemical changes in the recording material by the developed heat to produce sharply defined marking indicia on the recording material, which marking indicia are proportional in intensity to the received signal energy, and providing relative movement between the stylus and the recording material to produce, under the control of the heat losses developed a recorded pattern on the recording material.

HENRY SHORE.